(12) United States Patent  
Prust et al.

(10) Patent No.: US 7,419,461 B2  
(45) Date of Patent: Sep. 2, 2008

(54) MACHINE TOOL WITH TRANSPORT CHAIN

(75) Inventors: Dirk Prust, Tuttlingen (DE); Hans-Henning Winkler, Tuttlingen (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 0 days.

(21) Appl. No.: 10/941,780

(22) Filed: Sep. 15, 2004

(65) Prior Publication Data

US 2005/0159280 A1 Jul. 21, 2005

(30) Foreign Application Priority Data

Sep. 17, 2003 (DE) ................. 103 44 642

(51) Int. Cl.
*B23Q 3/157* (2006.01)

(52) U.S. Cl. .......................... 483/56; 483/66

(58) Field of Classification Search .................. 438/68, 438/54–57, 59
See application file for complete search history.

(56) References Cited

U.S. PATENT DOCUMENTS

| | | | | |
|---|---|---|---|---|
| 3,355,797 | A | * | 12/1967 | Lohneis ........................ 483/66 |
| 3,509,619 | A | * | 5/1970 | Lipp ............................ 483/32 |
| 3,858,286 | A | * | 1/1975 | Nohejl ......................... 483/32 |
| 4,216,572 | A | * | 8/1980 | Matsushita et al. ............. 483/32 |
| 4,221,043 | A | * | 9/1980 | Dailey ......................... 483/44 |
| 4,571,813 | A | * | 2/1986 | Fukuoka et al. ............... 483/37 |
| 5,476,436 | A | * | 12/1995 | Klicpera ....................... 483/68 |
| 5,542,899 | A | * | 8/1996 | Yamada et al. ................ 483/32 |
| 5,971,904 | A |   | 10/1999 | Soltermann et al. |
| 6,024,681 | A | * | 2/2000 | Latten et al. .................. 483/29 |
| 6,066,078 | A |   | 5/2000 | Koelblin et al. |
| 6,099,449 | A | * | 8/2000 | Geiger ......................... 483/56 |
| 6,428,454 | B1 | * | 8/2002 | Yokota et al. ................. 483/68 |
| 6,514,184 | B2 | * | 2/2003 | Oitaka et al. .................. 483/60 |
| 6,716,146 | B2 | * | 4/2004 | Kato ............................ 483/58 |
| 2003/0220178 | A1 | * | 11/2003 | Mattes et al. ................. 483/49 |

FOREIGN PATENT DOCUMENTS

| | | |
|---|---|---|
| DE | 89 15 599.8 | 12/1990 |
| DE | 199 19 446 A1 | 11/2000 |
| DE | 299 23 817 U1 | 7/2001 |
| DE | 201 11 119 U1 | 11/2001 |
| JP | 63102805 A * | 5/1988 |
| WO | 03/006203 A1 | 1/2003 |
| WO | 03/022515 A1 | 3/2003 |

* cited by examiner

*Primary Examiner*—David P. Bryant
*Assistant Examiner*—Eric A Gates
(74) *Attorney, Agent, or Firm*—Harness, Dickey & Pierce, P.L.C.

(57) ABSTRACT

A machine tool is provided with at least one tool spindle which is travelling in a work space (11) and on which a tool receptacle for clamping tools is provided. The machine tool also contains a magazine for tools which can be introduced into the tool receptacle in the tool spindle, the magazine having a transport chain which can be moved back and forth in a transport direction and on which carriers are arranged for receiving tools. The carriers extend from the transport chain essentially transversely to the transport direction. At least one carrier has at least two storage spaces for tools.

21 Claims, 3 Drawing Sheets

MACHINE TOOL WITH TRANSPORT CHAIN

BACKGROUND OF THE INVENTION

1. Field of the Invention

The present invention relates to a machine tool having at least one tool spindle which is travelling in a work space and on which a tool receptacle for clamping tools is provided, and having a magazine for tools which can be introduced into the tool receptacle in the tool spindle, the magazine having a transport chain which can be moved back and forth in a transport direction and on which carriers are arranged for receiving tools.

2. Related Prior Art

Such machine tools are frequently known from the prior art.

The known machine tools serve to produce workpieces, on which various operations have to be carried out with different tools in one set-up. For this purpose, the workpiece is mounted in place in a fixture on a workpiece table which is arranged in the work space of the machine tool.

The machine tool has a tool spindle which is travelling relative to the workpiece table in three coordinate directions and on the end face of which a tool receptacle is provided, in which the tools can be clamped in place for machining the mounted workpiece. In order to permit rapid machining of the workpiece, the tools are changed automatically, for which purpose a magazine is provided on the machine tool, in which magazine the various tools required during the machining of the workpiece are kept available.

In particular when the number of tools required is very high, so-called chain magazines are used, in which the individual chain links are designed as carriers for the tools. The carriers thus form a transport chain, which can be designed as an endless chain and is moved back and forth in a transport direction. In this way, it is possible to bring the tool required next in each case into its transfer position relative to the spindle by moving the transport chain either in or against the transport direction. This movement of the transport chain is also referred to as indexing.

During a tool change, first of all an empty storage space is moved up to the transfer position, whereupon the tool used last is deposited in this empty storage space. The transfer between the tool receptacle in the tool spindle and the storage space in the transport chain is effected, for example, by means of a tool changer, which has a gripping arm for gripping the tool at a collar specially provided for this purpose, whereupon the tool is then ejected from the tool spindle. The gripper deposits the tool in the storage space, where it is held by spring pressure.

On the other hand, it is also possible to dispense with the tool change and to approach the storage spaces directly with the spindle. To this end, the front end of the magazine is moved into the work space, or the spindle is moved out of the normal working region and above of the chain magazine, so that the spindle can be positioned above the storage space. This type of tool change is also referred to as "pick-up".

After the tool which has been in use beforehand has been deposited in an empty storage space in this way, the magazine is indexed, so that the storage space having the tool which is to be introduced next is moved into the transfer position. This transfer position is provided at the front end at the chain magazine, which is moved in an arc into the work space and out of the work space again.

When the new tool has been inserted into the spindle either by the pick-up method or by means of a tool changer, the chain magazine is retracted out of the work space or is provided with an appropriate protective cover. In this way, chips which are produced during the machining of the workpiece are prevented from contaminating the magazine and/or the tools mounted in the magazine.

In the known machine tools, it is therefore always necessary to index the magazine for the tool change. In the most unfavourable case, the tool to be used next is located at the opposite end of the transport chain, so that the storage space with the tool which is next to be introduced as replacement has to move along half the possible traverse path until it reaches the transfer position. Provided the storage space with the new tool is further away from the transfer position in the transport direction than half the traverse path, the transport chain is moved against the transport direction, as a result of which a distance shorter than half the transport path has to be covered.

In the machine tools and magazines described in this respect, it is disadvantageous that the average tool change time depends on the length of the transport chain and thus on the maximum number of tools to be stored. The more storage spaces such a transport chain has, the longer it is and the more time is required for a tool change from the most unfavorable storage position.

The known arrangement is in particular disadvantageous when tools having extremely different dimensions are to be used. This is because the tool having the maximum dimensions then determines the size of a chain link which has to be designed as a carrier and thus as a storage space for the tools. Since all the chain links have the same dimensions for reasons of drive technology, guidance and other kinematics, the storage density for tools is extremely small in the known chain magazines. In other words, there is a lot of empty space between individual storage spaces in order to take into account the possible dimensions of extremely large tools.

On account of the high travelling speed of the tool spindle relative to the workpiece, the machining operations to be carried out with a tool can be performed in an extremely short time. Compared with these short machining times, the tool change time is relatively long for the abovementioned reasons, which is regarded on the whole as a disadvantage.

This long tool change time results in particular from the small storage density of the known chain magazines.

However, such chain magazines are used not only in single-spindle machines but also in so-called two-spindle machines in which two workpieces are machined simultaneously with two tool spindles which are arranged on a common carrier. The two tool spindles are at a defined distance from one another, the workpieces being mounted on the workpiece table at precisely this defined distance apart. In this way, it is possible to machine two workpieces simultaneously if the same tool is clamped in place in each tool spindle.

If it is desired to keep a large number of available tools in such two-spindle machines, the chain magazines discussed above are also used in two-spindle machines. In this case, it is possible, on the other hand, to assign a separate tool magazine to each tool spindle, which is complicate in terms of design and is accordingly costly. Furthermore, the disadvantages discussed above also then arise for two-spindle machines.

On the other hand, it is also possible to jointly assign one chain magazine to both tool spindles. If the tool change is to be effected by the pick-up method in this case, the individual storage spaces must be at a distance apart which corresponds to the center distance of the two tool spindles. This means that the turn around arc of the magazine in the work space must be designed to be of corresponding width, as a result of which the contour of the magazine gets in the way in the work space or can only be moved into the work space and out of the latter again in a complicated manner. Furthermore, the distance between the two tool spindles, which is around 250 mm for example, determines the storage density of the chain magazine. Due to the large distances between the individual storage spaces on the one hand, and because storage spaces now have to be provided in each case for a tool change on the other hand, the overall length of the magazine is considerably increased once again, which has the described adverse effects on the tool change time.

SUMMARY OF THE INVENTION

In view of the above, an object of the present application is to develop a tool magazine of the type mentioned at the outset in such a way that, in a simple design, a rapid tool change is possible in both single-spindle and two- or multi-spindle machines.

According to the invention, this and other objects are achieved in the machine tool mentioned at the outset in that the carriers extend from the transport chain essentially transversely to the transport direction, and at least one carrier has at least two storage spaces for tools. In this case, the at least one carrier may have at least two storage spaces lying side by side essentially transversely to the transport direction, the at least one carrier alternatively or additionally having at least one storage space pointing against the transport direction.

The objects underlying the invention are completely achieved in this way.

This is because the inventors of the present application have recognized that the packing density in a chain magazine can be increased by providing tool carriers which are preferably separate from the transport chain, the carriers extending essentially transversely to the transport direction. The expression "essentially transversely" also refers to a slightly oblique arrangement of the carriers. In this way, it is possible to provide two or more storage spaces per carrier. If the storage spaces are arranged side by side, an extremely large tool, a few average-sized tools or a plurality of small tools can be kept available per carrier. The geometry of the entire transport chain is now unaffected by an extremely large tool; large tools thus merely take up the storage space for smaller tools in "their" carrier. This results in a variable packing of tools in the novel magazine, so that the storage capacity of the novel magazine is markedly increased by this parallel storage potential per chain space, that is to say per carrier. With the increased storage capacity, however, the tool change time also decreases for the abovementioned reasons, since the average transport length of a carrier to the transfer position is markedly reduced compared with known chain magazines having the same storage capacity.

If the arrangement of the tools in this case is made in such a way that an empty storage space is also always provided per carrier next to storage spaces fitted with tools, an extremely quick tool change can he carried out with the novel machine tool. The tool used last is deposited in the empty storage space by the tool spindle, whereupon the spindle merely traverses the short distance to the next storage space of the same carrier and picks up a new tool there. In other words, it is no longer necessary to index the magazine between the depositing of the tool which has been used beforehand and the picking-up of the next tool.

According to a further object, with the novel machine tool the transport chain can now be configured completely independently of the configuration of the carriers for the tools. It is thus possible to use fine-link transport chains irrespective of the dimensions of the carriers, which makes possible a correspondingly narrower turn at the front end, protruding into the work space, of the magazine. As a result, the contour which gets in the way in the work space is markedly reduced, in which case considerably less design input is necessary in order to protect that part of the magazine which projects into the work space from chips, etc.

According to another object, two storage spaces pointing in opposite directions are provided on the carrier, and the novel machine tool may be provided with two transfer positions, at which tools can be transferred between the carrier and the tool receptacle. A storage space pointing in the transport direction can then be positioned at the first transfer position and a storage space pointing against the transport direction can then be positioned at the second transfer position. The carrier in this case may consist of two independent holders which point "in opposite directions" and are joined in pairs.

In other words, a carrier presents its storage space lying in the transport direction at the first transfer position and its storage space lying against the transport direction when the carrier has been moved into the second transfer position.

In single-spindle machines, the transfer position lying in the transport direction has according to another object a respective empty storage space in which a tool to be exchanged can be deposited, whereas the storage space pointing against the transport direction contains the new tool.

For the tool change, the carrier is this moved into the first transfer position, whereupon the tool spindle deposits its tool in the empty storage space. The carrier is then moved into the second transfer position, where the tool spindle picks up the next tool.

According to a still further object, the carrier has two or more storage spaces both in and against the transport direction.

The tool change is then effected first of all at the storage spaces lying in the transport direction, namely when the carrier is located in the first transfer position, and then at the storage spaces lying against the transport direction, namely when the carrier has been moved into the second transfer position.

Owing to the fact that a carrier now stores tools as it were in a Janus-like manner, the storage potential of the magazine is increased once again, which, for the abovementioned reasons, leads to a further reduction in the average tool change time. This is because tools are not only stored in parallel next to one another per chain space; the parallel storage potential has even been doubled once again per chain space.

According to one object, the transport chain is pointing towards the work space where it is guided in an arc each, one of the two transfer positions being provided on either side of the arc.

The tool change time is also reduced by this measure, for two carriers can now be moved simultaneously into transfer positions, the one carrier offering its storage spaces lying in the transport direction for the tool change and the other carrier offering its storage spaces lying against the transport direction for the tool change. In this way, a multiple tool change is possible in a single-spindle machine without the magazine having to be indexed. On the contrary, the spindle moves back and forth between the various storage spaces in order to deposit and pick up tools.

In an embodiment, it is preferred if the novel machine tool has two tool spindles arranged at a distance apart from each other.

It is advantageous here that the one tool spindle can effect the tool change at the first transfer position and the other tool spindle can effect the tool change at the second transfer position.

In this case, it is especially preferred if the two transfer positions have a center distance which corresponds to the distance between the two tool spindles.

Here, it is advantageous that the tool change can now be carried out synchronously for both tool spindles by the pick-up method. If two or more storage spaces are provided at each transfer position, the advantages of the very quick tool change which are discussed above in connection with the single-spindle machine are obtained.

Since the carriers now project as it were laterally from the transport chain, the magazine may also be used in two-spindle machines without the turn-around of the transport chain into the work space having to be designed to be very wide.

In this configuration, tools for both the first tool spindle and the second tool spindle are now provided per chain space. This also leads to an increase in the packing density of the magazine for two-spindle machines, which for the above-mentioned reasons helps to reduce the tool change time.

It may also be mentioned that tools to be used synchronously in the two tool spindles are stored in two carriers arranged one behind the other on the transport chain, these tools then pointing towards one another and being offered as it were parallel to one another in the work space during the turn of the first carrier along an arc with which the transport chain points into the work space.

A further advantage in this design can be seen in the fact that, in the transfer position, no carrier projects forwards into the work space, where its contour would get in the way.

In the two-spindle machine, according to one object of this invention the novel design is thus very space-saving and permits an extremely quick tool change. Of course, tools of different dimensions can also be stored here without the storage capacity overall being reduced in the way that is the case in the prior art.

In general, it is also preferred if a locking part is arranged on each carrier and holds a tool, accommodated in the carrier, in a positive-locking manner.

With this measure, it is advantageous that the traverse speed of the transport chain can be markedly increased compared with transport chains known from the prior art. This is because, at a high transport speed, in particular during the turn of the carriers along the arc, pointing into the work space, of the transport chain, there is the risk of the tools being thrown out of the holder on account of the high centrifugal forces. Since springs are used in the prior art for securing the tools in the storage spaces, the transport speed in known magazines is limited. Due to the positive locking, the weak point—the spring—is now removed, so that the transport speed can be increased compared with the prior art. This effect is increased even further if the holders are open in or against the transport direction, for the tools then cannot be thrown radially outwards. Conversely, this means that the average tool change time is further reduced.

The higher transport speed is also obtained in the novel machine tool owing to the fact that a fine-link chain can be used, which for kinematic reasons can be accelerated and braked quicker than the rough-link chains as used in the prior art.

In this case, it is preferred if the locking part releases the tool when the carrier is located in a transfer position, the locking part preferably being a locking plate displaceable transversely to the transport direction and having a positioning part, to which a further positioning part is assigned at the transfer position.

Here, it is advantageous that the release of the locking plate in the transfer position is effected as it were automatically. As soon as a carrier is located in transfer position, the two positioning parts interlock, as a result of which the locking plate becomes displaceable.

In particular when the storage spaces are formed by U-shaped holders open in or against the transport direction, the tool, after release of the locking plate, can now be pulled forwards out of the storage space, and the locking plate is displaced automatically transversely to the transport direction.

This measure also helps to reduce the tool change time, for the tools can be removed directly from the holders when the latter are located in the transfer position.

BRIEF DESCRIPTION OF THE DRAWINGS

Further advantages will become evident from the description and the attached drawing.

It goes without saying that the abovementioned features and the features still to be explained below can be used not only in the respectively specified combination but also in other combinations or on their own without departing from the scope of the present invention.

Figure 1:
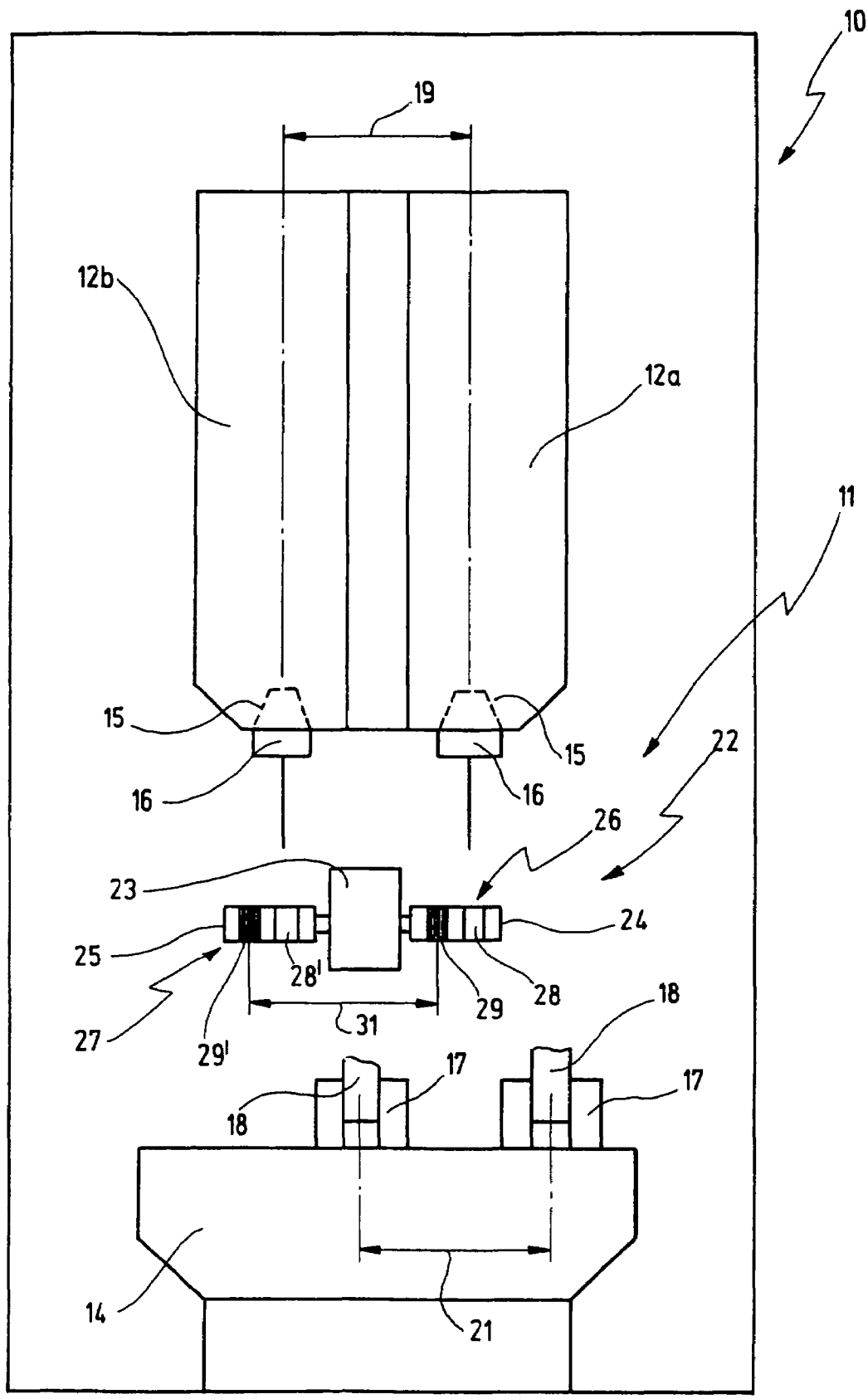

The invention is shown in the drawings and is described in more detail in the detailed description below. In the drawings:

FIG. 1 shows a novel machine tool in a schematic front view.

Figure 2:
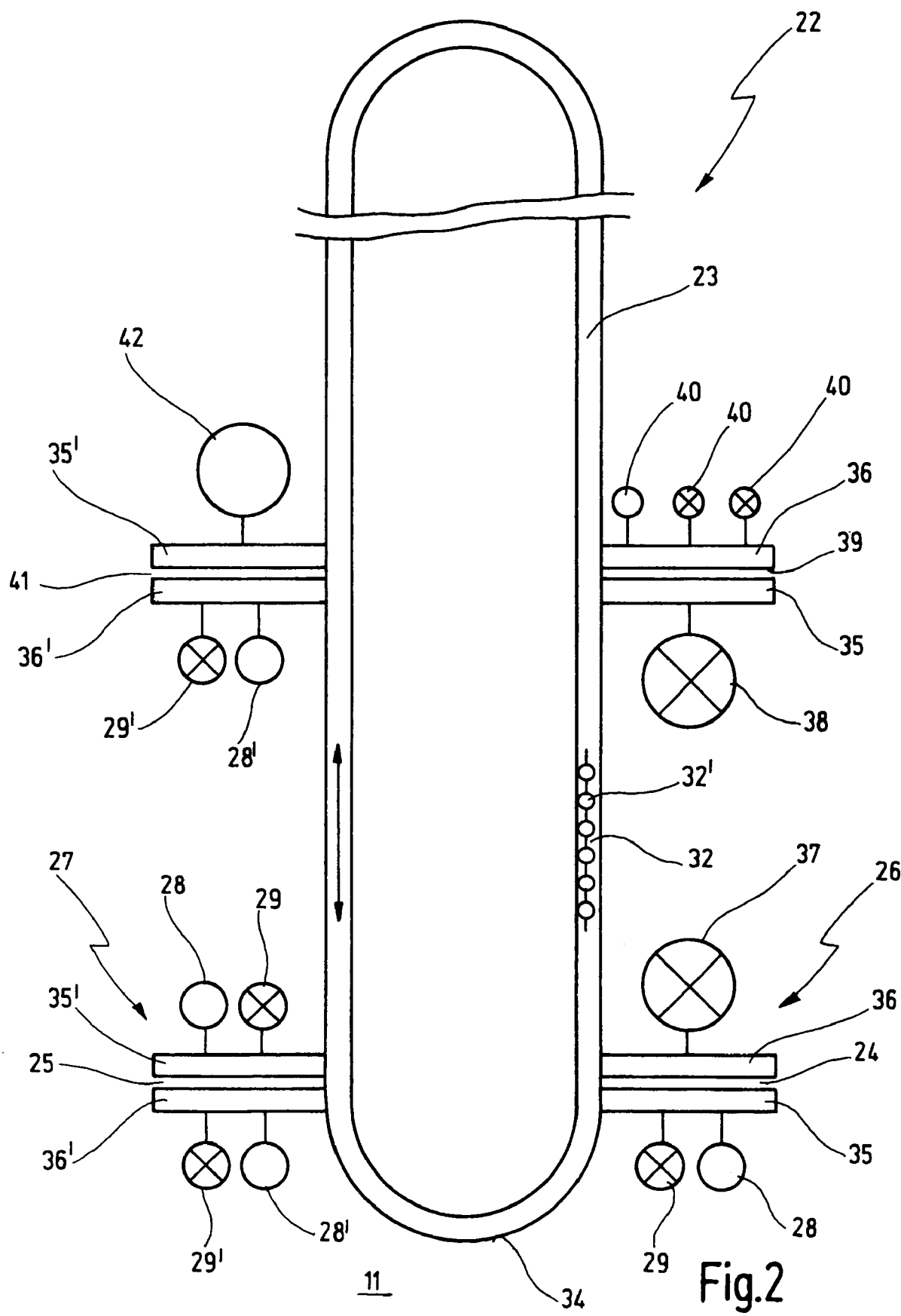
Figure 3:
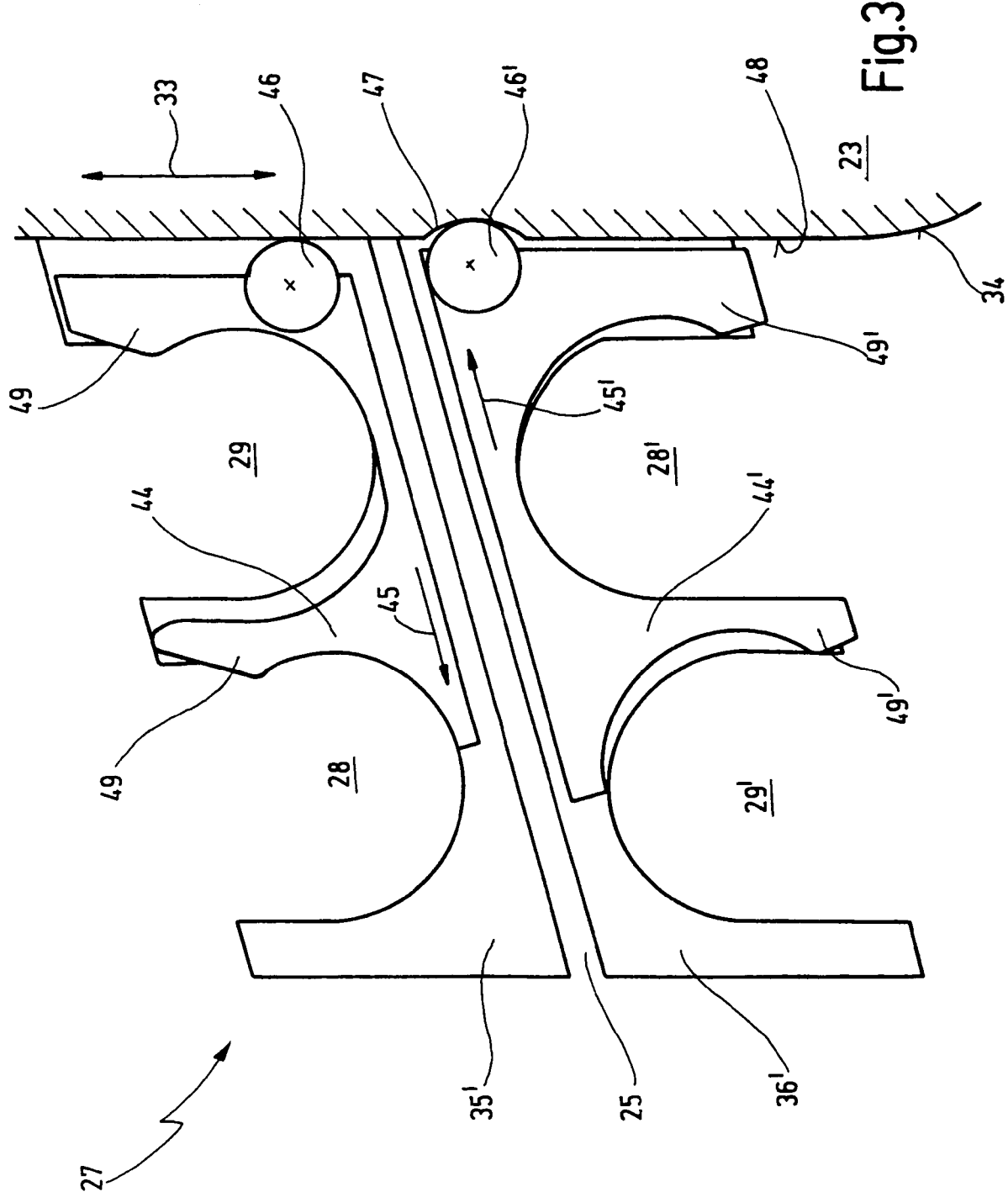

FIG. 2 shows a plan view of the magazine used in the machine tool from FIG. 1 for the tools, in an illustration which is not to scale; and FIG. 3 shows a carrier used in the magazine from FIG. 2 for tools.

DESCRIPTION OF A PREFERRED EMBODIMENT

Shown schematically in FIG. 1 in a front view and designated by 10 is a machine tool which has a work space 11 in which two tool spindles 12a and 12b are traversable relative to a workpiece table 14.

Each tool spindle 12a, 12b has a conventional tool receptacle 15, in which a respective tool 16 is clamped in place.

Workpieces 18 clamped in place in two fixtures 17 on the workpiece table 14 are machined by means of the tools 16.

The tool spindles 12a and 12b are at a distance apart which is indicated at 19 and which corresponds to a distance indicated at 21 between the fixtures 17 and thus between the workpieces 18. In this way, it is possible to machine the workpieces 18 synchronously by means of the tool spindles 12a and 12b.

A magazine for tools 16 is indicated at 22 in the work space 11, this magazine normally being arranged behind the tool spindles 12a and 12b and being moved into the work space 11 merely for the tool change.

The magazine 22 comprises a chain housing which is indicated at 23 and beyond which a first carrier 24 projects laterally to the right and a second carrier 25 projects laterally to the left. The carrier 24 is located in a first transfer position 26 and the carrier 25 is located in a second transfer position 27. The carrier 24 is provided for the tool change at the tool spindle 12a and the carrier 25 is provided for the tool change at the tool spindle 12b.

Both carriers 24, 25 have an empty storage space 28 or 28', respectively, in which the tool 16 clamped in place in the tool spindles 12a, 12b can be deposited. Furthermore, a further storage space 29, 29' is provided in both carriers 24, 25 and is fitted with a tool which is next to be introduced as replacement into the tool spindles 12a, 12b.

The storage spaces 28 and 28' and respectively 29 and 29' are at a distance from one another which is indicated at 31 and corresponds to the distance 19 between the tool spindles 12a and 12b.

In this way, it is possible to first of all deposit the tools 16 synchronously in the storage spaces 28, 28' and then remove tools from the storage spaces 29, 29'.

The magazine 22 from FIG. 1 is shown in FIG. 2 in a schematic plan view, the illustration not being to scale.

It can be seen in FIG. 2 that a transport chain 32 formed from chain links 32' runs in the chain housing 23. The transport chain 32 is closed upon itself and can be moved in a transport direction indicated at 33 both clockwise and anti-clockwise, in a circuit as it were. In the work space 11, the chain housing 23 and thus the transport chain 32 describe an arc 34 at the front end, which permits a deflection by 180°.

On both sides of the arc 34, the carriers 24 and 25 are indicated in the transfer positions 26 and 27, as already known from FIG. 1.

Each carrier 24, 25 has a front holder 35, 35' end a rear holder 36, 36', which are joined together in pairs. The storage spaces 28, 29, 28', 29' are schematically indicated on these holders 35, 36, 35' 36'.

The carrier 24 has a storage space 37 for an extremely large tool on its rear bolder 36. A further storage space 38 for an extremely large tool is assigned to the storage space 37 and is arranged on the front holder 35 of a carrier 39. The carrier 39 has three storage spaces 40 for smaller tools on its rear holder 36.

Yet another carrier can be seen in FIG. 2 at 41, the rear holder 36' of this carrier being provided with storage spaces 28' and 29', whereas its front holder 35' has a storage space 42 for a large tool.

The arrangement in this case is made in such a way that the front holder 35, 35' offers its storage spaces for the tool change in each case in the right-hand transfer position 26, whereas the rear holder 36, 36' offers its storage spaces for the tool change when the associated carrier 24, 25, 39, 41 is in the left-hand transfer position 27.

In other words, this means that tools which are to be inserted simultaneously into the two tool spindles 12a and 12b from FIG. 1 must always be stored pointing towards one another in carriers lying behind one another in the transport direction.

If the transport chain 32 is now indexed clockwise in FIG. 2, the carrier 24 moves into the transfer position 27 and now offers the storage space 37 for the tool change. In the process, the carrier 39 has moved into the transfer position 26 and now offers the storage space 38 for the tool change.

It can be seen in FIG. 2 that the magazine 22 has a high storage density, which permits the storage of both extremely small tools at the storage spaces 40 and extremely large tools at the storage spaces 37, 32 and 42. Compared with the carriers 24, 25, 39 and 41, the chain links 32' are of very fine design, so that the arc 34 can be designed to be very narrow. The carriers 24, 25 project laterally from the arc 34 and they may have markedly larger transverse dimensions than corresponds to the width of the arc 34. This cannot be seen in the schematic illustration of FIG. 2.

The distance between two carriers 41, 25, 24, 39 arranged one behind the other on the transport chain 32 is determined by the circumferential distance between the two transfer positions 26 and 27. Since the arc 34 can be designed to be very narrow, the circumferential distance between carriers 24 and 25 in the transfer positions 26 and 27 is also small, which means, on the other hand, that a large number of carriers 24, 25, 39, 41 can be arranged one behind the other on the transport chain 32.

The carrier 25 in the transfer position 27 is shown in greater constructional detail in a plan view in FIG. 3.

Whereas the carriers 24, 25, 39, 41 in FIG. 2 are arranged perpendicularly to the transport direction 33, the holders 35', 36' run slightly obliquely to the transport direction 33.

It can be seen in FIG. 3 that the holders 35' and 36' each form two U-shaped receptacles, open in and respectively against the transport direction 33, for tools. These receptacles are the storage spaces 28, 28', 29 and 29'.

Arranged on the holders 35' and 36' are two locking plates 44 and 44' which are displaceable transversely to the transport direction 33, a factor which is indicated by arrows 45 and 45'. Arranged on the locking plates 44 and 44' are rollers 46 and 46' which can be displaced with the locking plates 44 and 44'.

The locking plate 44, on the holder 36' is displaced in the direction of the arrow 45', the roller 46' engaging in a hollow 47 which is provided in a side wall 48 of the chain housing 23. Lugs 49 and 49' are also provided on the locking plates 44, 44', a tool accommodated in the storage spaces 28 and 29 being locked in a positive manner by the said lug 49 or 49' in the position of the locking plate 44 which is shown for the holder 35'. The locking plate 44 is held in the position shown by the roller 46 being pressed in the direction of the arrow 45 by the side wall 48. In other words, as long as the roller 46 is not striking the hollow 47, the locking plate 44 cannot be displaced in such a way that the tools which sit in the storage spaces 28 and 29 can escape.

On the other hand, the holder 36' is located in the transfer position 27 to which the hollow 47 is assigned. The locking plate 44' can be displaced in the direction of the arrow 45', since the roller 46' can engage in the hollow 47. On account of the contour of the lug 49', the locking plate 44' is displaced in the direction of the arrow 45' if tools are pulled downwards in FIG. 3, that is to say in transport direction 33, out of the storage spaces 28' and 29', respectively, or are pushed into the latter. It is therefore not necessary to provide the locking plate 44' with a separate actuating mechanism.

If the magazine indexes again, the carrier 25 is moved upwards in FIG. 3, which means that the roller 46' rolls out of the hollow 47, so that the locking plate 44' is displaced in the opposite direction to the arrow 45', and tools which are located in the storage spaces 28' and 29', respectively, are locked in the holder 36' in a positive manner by the said locking plate 44'.

It may also be mentioned that the rollers 46 and 46' lie in different planes, so that the roller 46 cannot be released by the hollow 47. On the contrary, a hollow which is located in the transfer position 26 and lies at a different level from the hollow 47 is provided for the roller 46.

Therefore, what is claimed is:

1. A machine tool having at least one tool spindle on which a tool receptacle is provided for clamping tools, said tool spindle operating in a work space of said machine tool, a movable magazine for storing a plurality of tools in a plurality of storage spaces and for transporting a selected one of said plurality of tools from a storage space to a transport position for introduction into said tool receptacle of said tool spindle, said magazine having a transport chain on which is connected continuously during operation at spaced locations along said transport chain a plurality of carriers containing said plurality of storage spaces for receiving and storing said plurality of tools, said transport chain being arranged such as to collectively move all of said plurality of carriers back and forth in a transport direction corresponding to the direction of movement of said transport chain, wherein the carriers extend from the transport chain essentially transversely to said transport direction, at least one carrier having at least two storage spaces for receiving one of said tools, with one of said at least two storage surfaces pointing in said transport direction and another of said at least two storage surfaces pointing against said transport direction.

2. The machine tool of claim 1, wherein said at least one carrier comprises at least two storage spaces that lie side by side and are spaced apart transversely relative to said transport direction.

3. The machine tool of claim 1, having two transfer positions at which tools can be transferred between a carrier and said tool receptacle, the arrangement being such that at least one storage space pointing in said transport direction is to be positioned at said first transfer position and at least one storage space pointing against said transport direction being positioned at the second transfer position.

4. The machine tool of claim 3, wherein said transport chain points towards the work space where it is guided along an arc, each of said two transfer positions being provided on either side of said arc.

5. The machine tool of claim 1, wherein said storage space comprises a U-shaped holder open in or against said transport direction.

6. The machine tool of claim 1, having two tool spindles arranged at a distance apart from each other.

7. The machine tool of claim 1, which has a locking part arranged on each carrier and holding a tool accommodated in the carrier in a positive-locking manner.

8. The machine tool of claim 7, wherein said locking part is arranged such as to release said tool when said carrier is located in a transfer position.

9. The machine tool of claim 8, wherein said locking part comprises a locking plate displaceable transversely to said transport direction and having a positioning part to which a further positioning part is assigned at said transfer position.

10. The machine tool of claim 1, having at least one transfer position enabling transfer of a tool between a selected carrier and said tool receptacle when said selected carrier is moved by said transport chain into said transfer position.

11. The machine tool of claim 1, wherein said at least one carrier is arranged for transporting in said transverse direction a selected one of said tools between one of said at least two storage spaces and said tool receptacle of said tool spindle.

12. The machine tool of claim 11, having at least one transfer position enabling transfer of said selected one of said tools between one of said at least two storage spaces and said tool receptacle when said at least one carrier is moved by said transport chain into said transfer position.

13. The machine tool of claim 1, wherein said transport chain is movable into said workspace.

14. The machine tool of claim 13, having two transfer positions at which tools can be transferred between a carrier and said tool receptacle, the arrangement being such that at least one storage space pointing in said transport direction is to be positioned at said first transfer position and at least one storage space pointing against said transport direction being positioned at the second transfer position.

15. The machine tool of claim 14, wherein said transport chain points towards the work space where it is guided along an arc, each of said two transfer positions being provided on either side of said arc.

16. The machine tool of claim 14, having two tool spindles arranged at a distance apart from each other.

17. The machine tool of claim 16, wherein said two transfer positions have a center distance which corresponds to the distance between the two tool spindles.

18. The machine tool of claim 1, wherein said transport chain is a continuous chain on which all of said plurality of carriers are connected continuously during operation at spaced locations so that all of the stored tools are collectively moved back and forth in the transport direction with movement of the transport chain.

19. The machine tool of claim 18, wherein the relative spaced locations of said plurality of carriers along said transport chain remain constant during operation of the machine tool.

20. A machine tool having at least one tool spindle on which a tool receptacle is provided for clamping tools, said tool spindle operating in a work space of said machine tool, a movable magazine for storing a plurality of tools in a plurality of storage spaces and for transporting a selected one of said plurality of tools from a selected one of said plurality of storage spaces to a transport position for introduction into said tool receptacle of said tool spindle, said magazine having a transport chain on which is connected at spaced locations along said transport chain a plurality of carriers containing said plurality of storage spaces for receiving and storing said plurality of tools, said transport chain being arranged such as to collectively move said plurality of carriers back and forth in a transport direction, wherein said transport chain is movable into said workspace, wherein the carriers extend from the transport chain essentially transversely to said transport direction, and at least one carrier having at least two storage spaces for receiving one of said tools, with one of said at least two storage spaces pointing in said transport direction and another of said at least two storage spaces pointing against said transport direction, said machine tool having two transfer positions at which tools can be transferred between a carrier and said tool receptacle, the arrangement being such that at least one storage space pointing in said transport direction is to be positioned at said first transfer position and at least one storage space pointing against said transport direction being positioned at the second transfer position.

21. A machine tool having at least one tool spindle on which a tool receptacle is provided for clamping tools, said tool spindle operating in a work space of said machine tool, a movable magazine for storing a plurality of tools in a plurality of storage spaces and for transporting a selected one of said plurality of tools from a selected one of said plurality of storage spaces to a transport position for introduction into said tool receptacle of said tool spindle, said magazine having a transport chain on which is connected at spaced locations along said transport chain a plurality of carriers containing said plurality of storage spaces for receiving and storing said plurality of tools, said transport chain being arranged such as to collectively move said plurality of carriers back and forth in a transport direction, wherein the carriers extend from the transport chain essentially transversely to said transport direction, at least one carrier having at least two storage spaces for receiving one of said tools, wherein said at least one carrier comprises at least two storage spaces that lie side by side and extend essentially transversely to said transport direction, and wherein said at least one carrier comprises at least one storage space pointing in said transport direction and at least one storage space pointing against said transport direction, said machine tool having two transfer positions at which tools can be transferred between a carrier and said tool receptacle, the arrangement being such that at least one storage space pointing in said transport direction is to be positioned at said first transfer position and at least one storage space pointing against said transport direction being positioned at the second transfer position.

* * * * *

UNITED STATES PATENT AND TRADEMARK OFFICE
CERTIFICATE OF CORRECTION

PATENT NO. : 7,419,461 B2  
APPLICATION NO. : 10/941780  
DATED : September 2, 2008  
INVENTOR(S) : Dirk Prust et al.

Page 1 of 1

It is certified that error appears in the above-identified patent and that said Letters Patent is hereby corrected as shown below:

<u>Column 9 Claim 1</u>,  
Line 5, "surfaces" should be -- spaces --.  
Line 6, "surfaces" should be -- spaces --.

Signed and Sealed this

Thirtieth Day of December, 2008

JON W. DUDAS  
*Director of the United States Patent and Trademark Office*